United States Patent [19]
Hammond

[11] 3,826,931
[45] July 30, 1974

[54] DUAL CRYSTAL RESONATOR APPARATUS

[75] Inventor: Donald L. Hammond, Los Altos Hills, Calif.

[73] Assignee: Hewlett-Packard Company, Palo Alto, Calif.

[22] Filed: Feb. 8, 1971

[21] Appl. No.: 113,668

Related U.S. Application Data

[63] Continuation-in-part of Ser. No. 678,384, Oct. 26, 1967.

[52] U.S. Cl. .................... 310/8.1, 310/8.9, 310/9.5, 331/163
[51] Int. Cl. .................... H01v 7/00
[58] Field of Search ........... 310/8, 8.1, 8.9, 9.0, 9.5, 310/9.7; 331/116, 154, 163; 333/72

[56] References Cited

UNITED STATES PATENTS

| | | | |
|---|---|---|---|
| 1,915,368 | 6/1933 | Lack | 310/9.7 X |
| 2,536,111 | 1/1951 | Van Dyke | 310/9 X |
| 2,859,346 | 11/1958 | Firestone et al. | 310/9.5 X |
| 3,200,271 | 8/1965 | Haines | 310/8.9 |
| 3,270,296 | 8/1966 | Aizawa et al. | 331/163 X |
| 3,289,055 | 11/1966 | Aizawa et al. | 331/163 X |
| 3,414,794 | 12/1968 | Wood | 310/8.9 |

*Primary Examiner*—Mark O. Budd
*Attorney, Agent, or Firm*—A. C. Smith

[57] ABSTRACT

Algebraic combination of the frequencies of two or more selected modes of piezoelectric crystal resonator vibrations yields a total frequency signal output which has a substantially zero temperature coefficient of frequency.

6 Claims, 3 Drawing Figures

INVENTOR
DONALD L. HAMMOND
BY R. C. Smith
ATTORNEY

DUAL CRYSTAL RESONATOR APPARATUS

This is a continuation-in-part application of pending application Ser. No. 678,384 entitled ZERO TEMPERATURE COEFFICIENT CRYSTAL RESONATOR APPARATUS, filed on Oct. 26, 1967, by Donald L. Hammond.

BACKGROUND OF THE INVENTION

Conventional methods for making the frequency of a quartz crystal resonator independent of temperature include controlling the ambient temperature of the crystal by means of a heated oven. This method is undesirable for use in transistor circuits as the oven draws power comparable to the total power of the circuit. In addition, the thermal stabilization time defeats the advantage of instantaneous warm-up of transistor circuits.

SUMMARY OF THE INVENTION

The present invention algebraically combines the frequencies of selected modes of piezoelectric crystal resonator vibrations to provide a total frequency signal output which is stable over a large temperature range.

A single piezoelectric crystal of a selected orientation may be vibrated in two selected modes simultaneously, the algebraic combination of the separate frequencies of these modes being stable over a large temperature range. Alternatively, separate crystals at the same temperature may each be vibrated in different modes such that the sum or difference of their separate vibrational frequencies is essentially independent of the temperature of the two crystals. The quartz crystals are selected such that both resonator orientations exhibit substantially identical ratios of second order to first order temperature coefficients of frequency; substantially equal ratios of third order to first order temperature coefficients of frequency, and unequal values of first order temperature coefficients of frequency.

DESCRIPTION OF THE PREFERRED EMBODIMENTS

Figure 1:
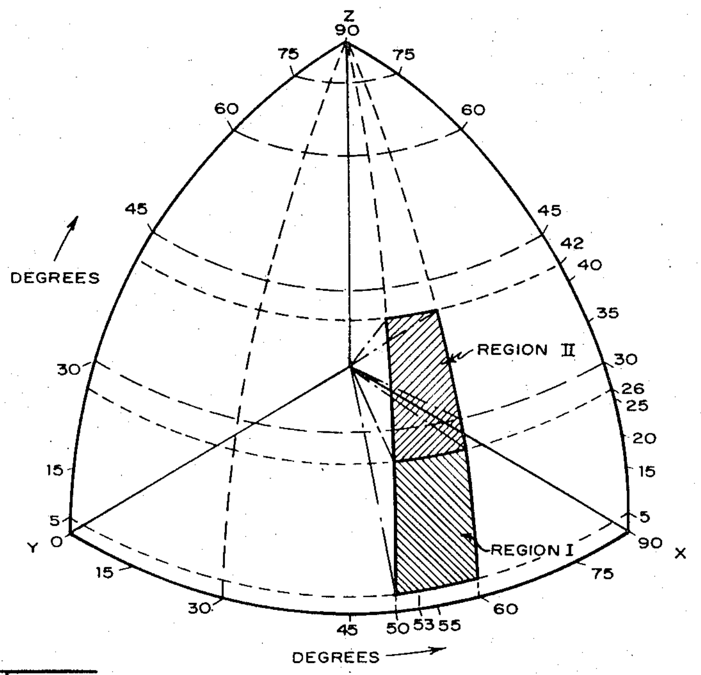
FIG. 1 is a graph on spherical coordinates showing the regions of crystal orientation from which two separate crystal resonators can be selected and their frequencies algebraically combined to provide a total frequency which is substantially independent of crystal temperature.

Investigations have shown that the temperature coefficient of frequency of a quartz crystal resonator unit can be made zero at a specific temperature by utilizing a crystal resonator cut with the proper crystal lattice orientation. However, since the density, dimensions, and elastic constants of the crystal resonator are non-linear functions of temperature, the temperature coefficient of frequency is non-zero at other temperatures. It has been shown that the frequency-temperature behavior of precision cut quartz resonators free of interfering modes of motion can be well represented by a power series expansion. Over a temperature range of two hundred degrees centigrade the contribution of fourth and higher order terms is typically less than one part in $10^8$. The limited expansion for frequency is: as a function of temperature $f=f_0\,[1+aT+bT^2+cT^3]$ where: $f_0$ is the resonant frequency at zero degrees centigrade, $a$, $b$ and $c$ are first, second and third order temperature coefficients of frequency, and T is crystal temperature in degrees centigrade. Hence, to very good approximation, the problem of obtaining a crystal unit with frequency independent of temperature becomes one of satisfying the three conditions of making the three temperature coefficients, a, b and c, equal to zero.

There are three modes of motion in the thickness direction of an infinite plate, designated A, B and C. In all materials the three displacement directions of the three thickness modes are mutually perpendicular. For isotropic or cubic material, these three displacement directions are such that two are shear and one is thickness extension, and the directional displacements are either in the plane of the resonator or perpendicular to it. For anisotropic material, the three displacement directions are always orthogonal but in general the displacement directions are neither parallel to nor exactly perpendicular to a normal to the surface.

There are basically two degrees of freedom which can be used in the design of thickness resonators, the $\phi$ and $\theta$ spherical coordinates of the direction of propagation. In addition to these two degrees of freedom there are, of course, the three choices of modes of motion (i.e., the A, B and C modes) which designate rather arbitrarily the three thickness modes, A being the mode with the highest frequency, and C being the mode with the lowest frequency. The additional degree of rotational freedom (designated the $\psi$ angle in I.E.E.E. notation) is not available as an additional degree of freedom. The $\psi$ orientation of the displacement directions are determined by the anisotropy of the crystal plate rather than by the geometry of its perimeter in all cases except those which have complete elastic symmetry around the normal of the plate. In these cases, two of the modes of motion are degenerate and again the mode frequencies are independent of $\psi$.

Slight perturbations are introduced by other design parameters. These include variations in the contour of the plate, slight variations in the properties due to reducing the diameter from an infinite plate, variations within the material of the plate, and the like. In thickness resonators which are free from coupled modes and which provide reliable performance over wide temperature ranges, the other resonator design features provide little important contribution as a design parameter degree of freedom.

Hence, it is evident that there are generally two degrees of freedom available to satisfy three conditions. Extensive exploration of all of the possible orientations in quartz has verified this fact. Only resonators which exhibit zero values of two of three temperature coefficients exist in nature. Consistent with this, crystalline quartz does not exhibit an orientation for which all three coefficients are zero.

It is possible to combine modes of motion of a single plate to obtian new frequencies, because the three thickness modes of motion are orthogonal and can exist simultaneously without mutually interfering with each other. As a result, oscillations can be obtained by separately driving a single crystal at the frequencies of two or three orthogonal thickness modes. Hence, additional sets of frequencies with two degrees of freedom can be obtained. However, simply adding or subtracting the discreet frequencies of the A mode, B mode, and C mode produces only a finite set of discreet combinations and leaves only two degrees of freedom to satisfy the requirements that the three temperature coefficients be zero.

It is possible, however, to add the fraction of the frequency of one mode to the frequency of a second mode in a single crystal unit to obtain an additional degree of freedom. Mathematically this can be shown by setting $f = f_C + Kf_B$ where $f$, $f_C$ and $f_B$ are frequencies and K is a constant chosen such that the first order temperature coefficient of the sum of the frequencies, $f$, is zero; then the second and third order temperature coefficients of the frequency of the sum can, if a solution exists, be satisfied by the two degrees of orientational freedom. Thus in this manner there are obtained three degrees of freedom for each plate: K, the ratio of the two frequencies added $\phi$ and $\theta$, spherical coordinates of the direction of propagation to establish zero coefficients for the first three orders of the power series expansion of frequency with respect to temperature.

By making the general expression in which f is equal to $f_C + Kf_B$ and determining for any quartz orientations (except singularities for which $f_B$ has a zero temperature coefficient) a value K such that the partial derivative of f with respect to temperature is zero, then a unique value of K will result for every orientation. The total frequency temperature behavior of this sum will be given by the expression:

$f_T^{(2)} = f^{(0)}{}_C + Kf^{(0)}{}_B + (T_f^{(2)}{}_C + KT_f^{(2)}{}_B)\,T^2 + (T_f^{(3)}{}_C + KT_f^{(3)}{}_B)T^3$. It should be then possible to satisfy the conditions that the first, second, and third order coefficients of the sum frequency, $f_T$, be zero by adjusting the value of K to make the first order term zero and adjusting $\phi$ and $\theta$ to make the second and third order terms zero. Since the fourth and higher order terms are generally negligible in quartz, this should result in a frequency which is essentially independent of temperature. However, in order to solve the three parameters with three degrees of freedom, there must be a corresponding finite solution in the characteristics of the quartz crystal within the desired tolerances. That is, $\phi$ and $\theta$ must be located exactly in the crystal and K must be synthesized to an exact ratio. Because of the small tolerances required this is a very difficult solution to obtain in practice.

Instead of oscillating a single piezoelectric crystal in two different modes and adding the synthesized frequencies, two separate crystals can be oscillated, each providing a separate vibrational mode. The modes are selected such that the algebraic combination of their resonant frequencies will not vary with their temperature, the two crystals being disposed in intimate thermal contact so they are essentially at the same temperature.

By adding the frequency of a mode of motion in a first crystal to the frequency of a mode of motion in a second crystal with a frequency K times the frequency of the first crystal, there exist five degrees of freedom to satisfy the three required parameters. These degrees of freedom are the $\phi$ and $\theta$ spherical coordinates for each of the two crystals, called, for example, types I and II and the ratio K between their frequencies. Since there are two excess degrees of freedom, a two-dimensional region of solution exists rather than a point solution. The analysis would indicate a region I in $\phi$ and $\theta$ for the first crystal and another region II in $\phi$ and $\theta$ for the second crystal. Thus, for any first crystal at a specific orientation $\phi$ and $\theta$ lying within region I, there will exist a second crystal in region II such that their frequencies in ratio K can be added or subtracted to provide a frequency that is independent of temperature at least to third order. Thus, there is one to one mapping of orientations in region I upon orientations in region II. This approach has two distinct advantages. First, it is no longer necessary to synthesize before addition because the thickness of the resonators can be adjusted to satisfy the output frequency and satisfy the ratio K. The second advantage of this approach is that experimental variations in generating resonators of type I map directly onto a similar region in type II and it should be possible to generate either a one dimensional or two dimensional matrix to sort resonators of each type to provide matching pairs.

The conditions that must be satisfied by the combination of the two crystals are that the absolute frequency temperature characteristics of the two crystals be either identical or exactly opposite such that when the two crystals are added or subtracted the temperature dependence is exactly eliminated. This compensation can be assured to the third order if two crystallographic orientations can be found which exhibit exactly identical ratios of second order temperature coefficients in both orientations and exactly equal ratios of third order to first order temperature coefficients for the two orientations. The solution is nontrivial if the first order temperature coefficients are not also identical.

The method of arriving at a solution requires the computation of these ratios at matrix points in $\phi$ and $\theta$ which are positioned close enough to represent well all possible variations of resonators. These ratios of temperature coefficients are then sorted in ascending order and matching crystallographic orientations are chosen which exhibit identical ratios but have nonidentical first order temperature coefficients. Since there are five degrees of freedom, that is $\phi$ and $\theta$ for crystal of type I, $\phi$ and $\theta$ for crystal of type II and the ratios of the two frequencies, the solution appears as regions. Any crystal of type I with any value of $\phi$ and $\theta$ within region I will have a matching crystal of type II at some specific value of $\phi$ and $\theta$ within region II which exactly compensates its temperature coefficient characteristics. This value can be arrived at by the method described above using matrix techniques to bracket the approximate orientation and then interative computer techniques to find the exact value.

Regions of solutions for piezoelectric quartz crystals found using the above method of iterative computation describe region I by a $\theta$ orientation between about 5 and 26 degrees and a $\phi$ orientation between about 50° and 60°, and region II by a $\theta$ orientation between about 26 and 42 degrees and a $\phi$ orientation between about 50° and 60°, as shown in FIG. 1.

Also, since it is well known that quartz crystals exhibit trigonal symmetry, it will be recognized that there are additional identical regions I and II in which the characteristics of a resonator having a given orientation may also be obtained. Thus, for solutions having angular orientations $\theta_0$ and $\phi_0$ in regions I and II, there are also solutions in the upper hemisphere at:

$\theta = \theta_0$
$\phi = \phi_0 + m(120°)$ Where $m = 1, 2, 3$ and in the image regions at:

$\theta = \theta_0$
$\phi = (120°) - \phi_0 + m(120°)$ Where $m = 1, 2, 3$ and in corresponding regions in the lower hemisphere at:

$\theta = 180° - \theta_0$
$\phi = \phi_0 + 60° + m(120°)$ Where $m = 1, 2, 3$ and at:

$\theta = 180° - \theta_0$
$\phi = 60° - \phi_0 + m(120°)$ Where $m = , 2, 3$

More specifically, it can be shown that for a given crystal orientation within any such region I there is a specific orientation within any such region II which matches the above described temperature coefficient of frequency criteria. An example of such a pair of crystal resonators is a region I quartz crystal of orientation $\theta = 56.60°$ and $\phi = 21.80°$ and a region II crystal of orientation $\theta = 59.40°$ and $\phi = 34.60°$. The following table gives the values of first, second and third order temperature coefficients of frequency for each of these orientations, in addition to nominal frequencies of vibration for resonators of each crystal orientation at zero degrees centigrade:

| Region | Temperature Coefficients | | | Nominal Frequencies |
|---|---|---|---|---|
| | a | b | c | |
| | $\times 10^{-5}/°C$ | $\times 10^{-8}/°C$ | $\times 10^{-10}/°C$ | |
| II | 3.1836 | −1.0030 | −1.0718 | 24713004.899 |
| I | 5.3474 | −1.6846 | −1.7700 | 14713004.899 |

Expansion of the limited expression for frequency as a function of temperature $f = f_0 [1 + aT + bT^2 + cT^3]$ yields $f = f_0 + f_0aT + f_0bT^2 + f_0cT^3$.

Substitution of the values for these specific orientations yields:

$f_{II}$ = 24.713,004 mc. + $786.76 \times 10^{-6}$ mc./°CT − $247.87 \times 10^{-9}$/°CT² − $2648.74 \times 10^{-12}$/°CT³ and $f_I$ = 14.713,004 mc. + $786.76 \times 10^{-6}$ mc./°CT − $247.85 \times 10^{-9}$/°CT² − $2604.20 \times 10^{-12}$/°CT³.

Algebraically subtracting the frequency expression for this region I crystal from the region II crystal yields the following expression for total frequency as a function of temperature:

$f_T$ = 10.000,000 mc. + [0] $T$ − [$.02 \times 10^{-9}$/°C²] $T^2$ − [$44.54 \times 10^{-12}$/°C³] $T^3$.

The resulting coefficients of temperature are zero or very small showing the desired non-dependence of frequency upon temperature. In the same manner, two modes of vibration of a single crystal resonator can be chosen to fulfill the desired criteria and can then be algebraically combined in the same manner to provide a total frequency equation which is substantially independent of temperature.

Figure 2:
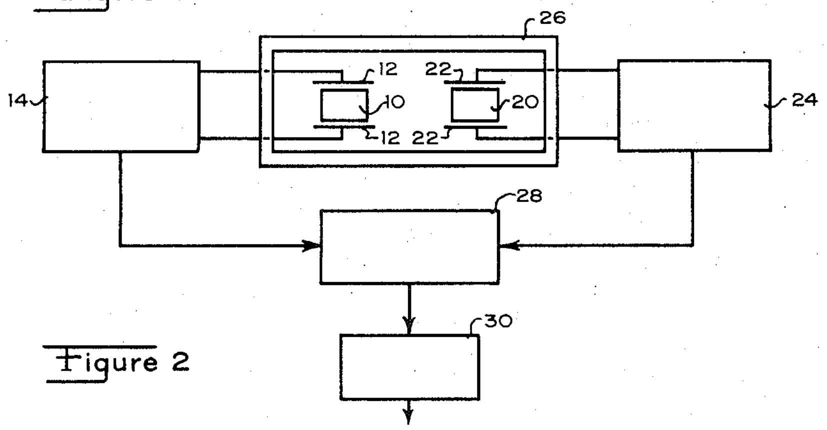
FIG. 2 is a schematic diagram of a preferred embodiment of the invention using two separate crystal resonators.

Referring now to FIG. 2, there is shown a schematic diagram of a preferred embodiment of the invention. Crystal resonator 10 disposed between electrodes 12 forms part of a conventional crystal-controlled oscillator 14 and is adapted to vibrate in response to vibration-exciting signal applied to electrodes 12. Crystal resonator 20 disposed between electrodes 22 similarly forms part of a conventional crystal-controlled oscillator 24 and is likewise adapted to vibrate in response to vibration-exciting signals from oscillator 24.

Crystal resonators 10 and 20 are maintained at substantially the same operating temperatures with an insulated shield 26 surrounding both crystals as illustrated in FIG. 2. In reality the resonators may each be contained within sealed copper cans which are joined together, the area within each can being filled with a thermally conductive, electrically insulating medium such as helium to assure that both resonators will be in intimate thermal contact.

The signal frequencies from the crystal-controlled oscillators are applied to mixer 28 which, in conjunction with filter 30, produces an output signal frequency that is the algebraic combination of frequencies derived from resonators 10 and 20, said output frequency having a temperature coefficient of frequency which is substantially zero. Resonators 10 and 20 have selected orientations such that they exhibit substantially identical ratios of second order to first order temperature coefficients, substantially equal ratios of third order to first order temperature coefficients, and unequal values of first order temperature coefficients. The orientations of crystals 10 and 20 will be so selected to fulfill these criteria, one of the crystals being within the orientation pictured as region I in FIG. 1, the other of orientation illustrated as region II.

Figure 3:
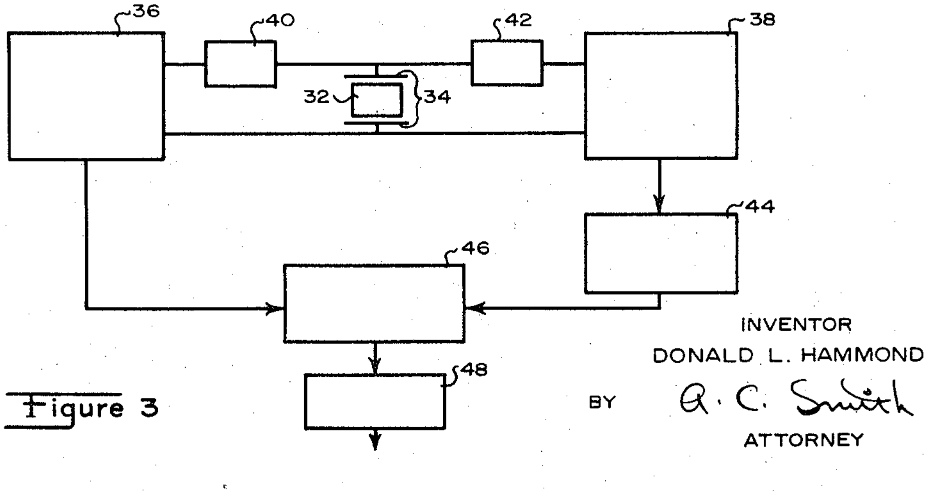
FIG. 3 is a schematic diagram of another embodiment of the invention using a single crystal resonator vibrated in two modes.

According to another embodiment of the invention, as shown by FIG. 3, a single crystal resonator 32 is vibrated simultaneously in two of its modes by a vibration-exciting electric field introduced in resonator 32 by application of an A–C signal to electrodes 34 by oscillators 36 and 38. The oscillators are designed to excite separate modes of vibration within resonator 32 at separate frequencies. Isolation networks 40 and 42, each having a "pole" or a "zero" at one of said frequencies, will allow simultaneous vibration in two modes through the single pair of electrodes 34. Synthesizer 44 produces a frequency signal which is a multiple of the frequency of the mode of vibration excited by oscillator 38. This synthesizer multiple may be positive or negative and may be less than one. Mixer 46 and filter 48 combine this multiplied frequency signal with the frequency of the other mode of vibration excited by oscillator 38 to produce an output signal which is representative of an algebraic combination of the vibration frequencies of the two modes of vibration and which has a temperature coefficient of frequency substantially equal to zero. Both modes of vibration exhibit substantially euqal ratios of second order to first order temperature coefficients, substantially equal ratios of third order to first order temperature coefficients, and unequal values of first order temperature coefficients.

I claim:

1. Signal frequency apparatus comprising:

first and second piezoelectric resonators of dissimilar crystallographic orientations, each having a coefficient of frequency with change of temperature and each being capable of vibrating substantially independently in accordance with its coefficient of frequency in response to vibration-exciting signal applied thereto;

means disposed about said resonators to maintain substantially equal operating temperatures of said resonators for altering the vibration frequency thereof in accordance with the respective frequency coefficients; and circuit means including electrodes disposed about said resonators for applying vibration-exciting signals thereto to sustain the independent vibrations of said resonators at different frequencies which are in accordance with the respective coefficients of frequency thereof, and including apparatus for producing an output signal frequency having substantially zero temperature coefficient of frequency as the selected combination of frequencies derived from vibrations of the first and second resonators.

2. Signal frequency apparatus as in claim 1 wherein:

for each of said resonators the coefficient of frequency is a non-zero temperature coefficient;

the first piezoelectric resonator is quartz having a $\theta_o$ orientation between the $\theta$ angles of about 5 degrees and about 26° and a $\phi_o$ orientation between the $\phi$ angles of about 50° and about 60°; and the second piezoelectric resonator is quartz having a $\theta_o$ orientation between the $\theta$ angles of about 26° and about 42° and a $\phi_o$ orientation between the $\phi$ angles of about 50° and about 60°.

3. Signal frequency apparatus as in claim 1 wherein:

for each of said resonators the coefficient of frequency is a non-zero temperature coefficient;

the first piezoelectric resonator is quartz having a $\theta_o$ orientation between the $\theta$ angles of about 15° and about 26° and a $\phi_o$ orientation between the $\phi$ angles of about 53° and about 60°, and the second piezoelectric resonator is quartz having a $\theta_o$ orientation between the $\theta$ angles of about 26° and about 42° and a $\phi_o$ orientation between the $\phi$ angles of about 50° and about 60°.

4. Signal frequency apparatus as in claim 2 wherein: the $\theta$ and $\phi$ orientations of the first and second resonators with respect to the values of $\theta_o$ and $\phi_o$ are:

$\theta = \theta_o$
$\phi = \phi_o + m(120°)$,
where $m = 1, 2, 3$; and
$\theta = \theta_o$
$\phi = 120° - \phi_o + m(120°)$,
where $m = 1, 2, 3$; and
$\theta = 180° - \theta_o$
$\phi = \phi_o + 60° + m(120°)$,
where $m = 1, 2, 3$; and
$\theta = 180° - \theta_o$
$\phi = 60° - \phi_o + m(120°)$,
where $m = 1, 2, 3$.

5. Signal frequency apparatus as in claim 3 wherein:

the $\theta$ and $\phi$ orientations of the first and second resonators with respect to the values of $\theta_o$ and $\phi_o$ are:

$\theta = \theta_o$
$\phi = \phi_o + m(120°)$,
where $m = 1, 2, 3$; and
$\theta = \theta_o$
$\phi = 120° - \phi_o + m(120°)$,
where $m = 1, 2, 3$; and
$\theta = 180° - \theta_o$
$\phi = \phi_o + 60° + m(120°)$,
where $m = 1, 2, 3$; and
$\theta = 180° - \theta_o$
$\phi = 60° - \phi_o + m(120°)$,
where $m = 1, 2, 3$.

6. Signal frequency apparatus as in claim 1 wherein:

each of said resonators vibrates in a mode which is characterized by known values of first, second and third order coefficients of frequency with change in temperature and for which the resonators have substantially equal ratios of second order to first order temperature coefficients, substantially equal ratios of third order to first order temperature coefficients, and unequal values of first order temperature coefficients; and said circuit means including the oscillator circuitry sustains vibration of said resonators in modes of vibrations for producing said output signal frequency which is substantially constant for changes in the temperature of the first and second resonators and which is at a frequency different from the vibration frequencies of at least one of the first and second resonators.

* * * * *

UNITED STATES PATENT OFFICE
CERTIFICATE OF CORRECTION

Patent No. 3,826,931 Dated July 30, 1974

Inventor(s) Donald L. Hammond

It is certified that error appears in the above-identified patent and that said Letters Patent are hereby corrected as shown below:

Column 2, line 65, "obtian" should read -- obtain --;

Column 4, line 32, after "second order" insert -- to first order --;

Column 5, line 22, "m = , 2 , 3" should read -- m = 1 , 2 , 3 --; in the table immediately following line 36, "x $10^{-5}$/°C" appearing in the column under the heading "Region" should instead appear immediately below "a" under the heading "Temperature Coefficients";

Column 6, line 61, "euqal" should read -- equal --.

Signed and sealed this 3rd day of December 1974.

(SEAL)
Attest:

McCOY M. GIBSON JR.
Attesting Officer

C. MARSHALL DANN
Commissioner of Patents